May 14, 1968  J. R. JAMES  3,383,257
METHOD OF FORMING A TUBE AND COATING THE INTERIOR SURFACE
WITH A FOAMABLE PLASTIC MIXTURE
Filed July 22, 1964  3 Sheets-Sheet 3
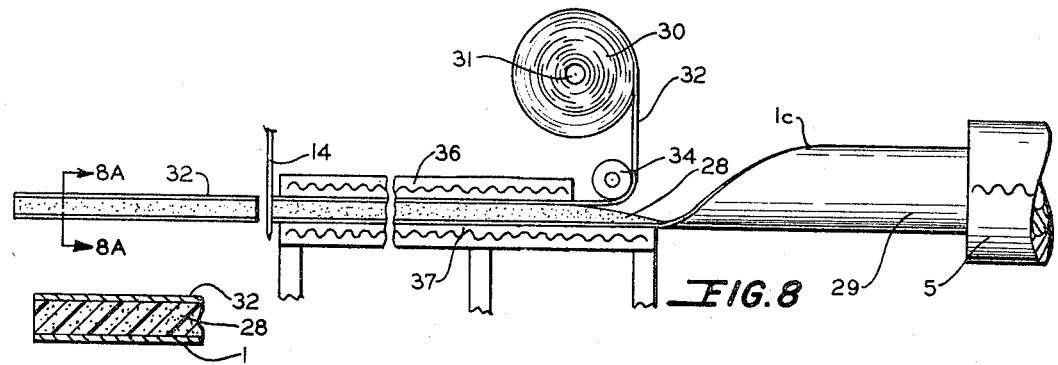
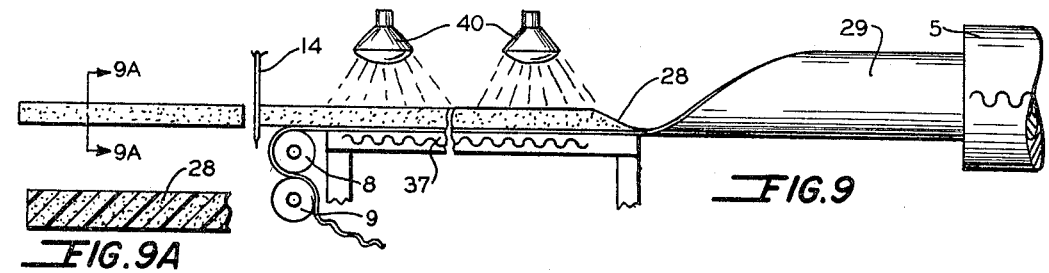
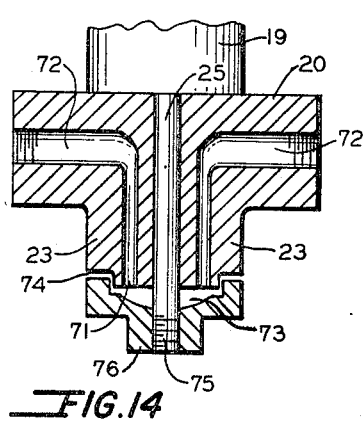
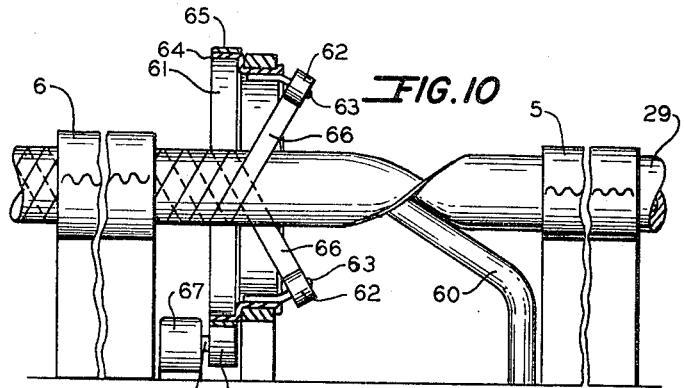
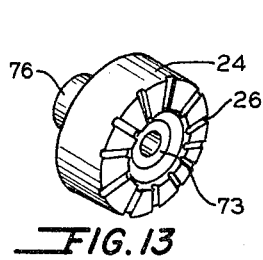
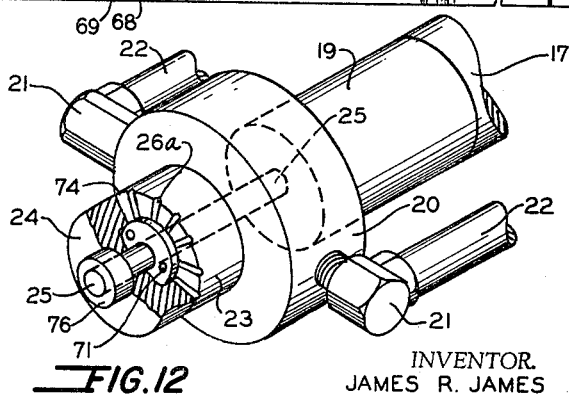
INVENTOR.
JAMES R. JAMES
BY
Wm. R Price
ATTORNEY

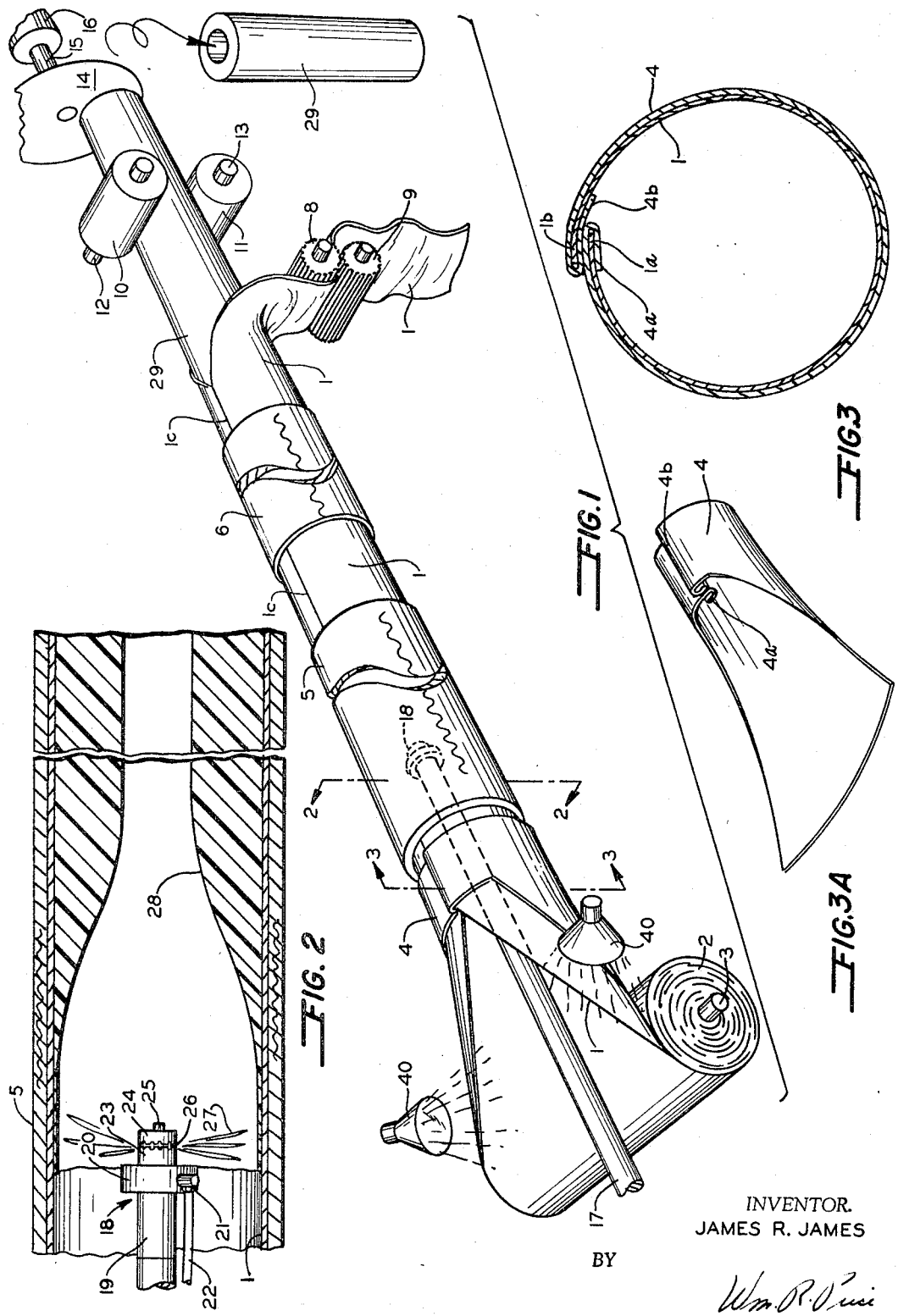

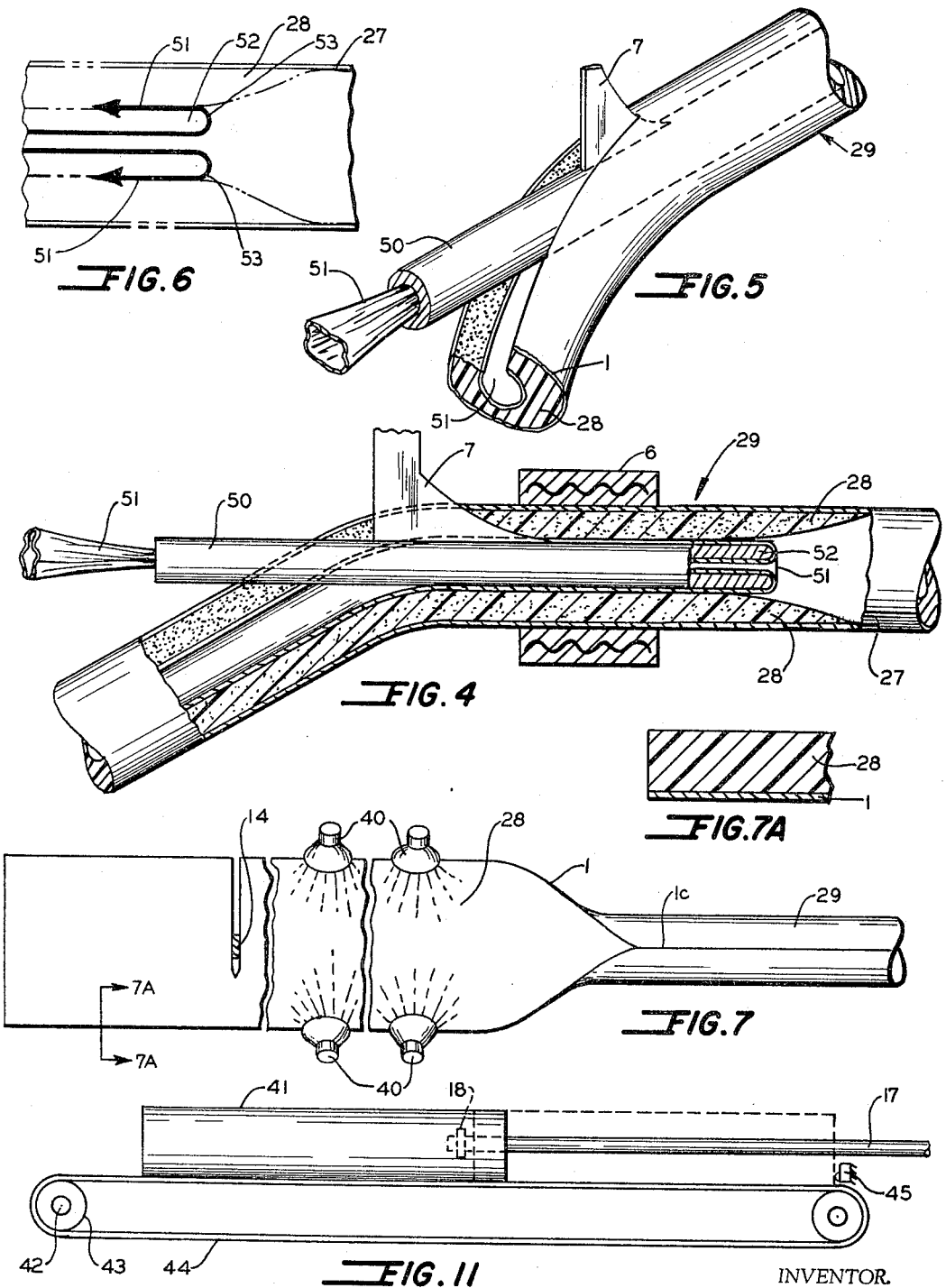

3,383,257
METHOD OF FORMING A TUBE AND COATING THE INTERIOR SURFACE WITH A FOAMABLE PLASTIC MIXTURE

James R. James, Louisville, Ky., assignor to The Martin Sweets Company, Inc., Louisville, Ky., a corporation of Kentucky
Filed July 22, 1964, Ser. No. 384,352
11 Claims. (Cl. 156—74)

ABSTRACT OF THE DISCLOSURE

Discloses an apparatus and process for continuously bending a sheet of flexible material to form a tube and coating the interior surface of the tube with polyurethane foam forming chemicals by means of a radially dispensing mixing and impelling device. The mixing and impelling device is inserted at the central point of the internal diameter of the formed tube and the impeller is spun so that the polyurethane foam forming chemicals are simultaneously mixed and thrown radially by centrifugal force to evenly coat the interior surface of the tube moving along its longitudinal axis. After the tube is coated with the polyurethane foam forming chemicals, it can either be supported in tubular condition to form a tube of polyurethane foam; have a second tube of flexible material inserted in the formed tube and adhesively secured to the rising foam so as to form a polyurethane foam tube having an inner and outer covering; be separated and brought to the flat condition to form a pad or blanket of polyurethane foam which may be laminated with a second sheet of flexible material; or the tube may be separated and reformed over a mandrel so that the polyurethane foam forming chemicals are located on the outside and said reformed tube may be wrapped with a second coating of flexible material as the foam rises and is in tacky condition.

---

This invention relates to a process and an apparatus for dispensing a foamable plastic mixture in a fluid stage onto an elongated moving substrate to produce a coating of uniform thickness thereon. More specifically, this invention relates to a process and means to coat the internal surface of a tubular member with a foamable mixture of reactive polyurethane foam forming chemicals whereby a foamed coating of uniform thickness and consistency is obtained. More specifically, this invention relates further to a means whereby a flexible sheet material is formed into a tube and thereafter coated with polyurethane foam forming chemicals.

In one embodiment, the flexible sheet, after being coated with reactive polyurethane foam forming chemicals, is returned to a flat planar position whereby the foamed polyurethane is allowed to rise and cure in a layer of uniform thickness. Other embodiments will be apparent from the detailed description hereof which follows.

Polyurethane, or simply urethane polymers, are a comparatively recent entry in the field of plastics. A variety of compounds containing one or more active hydrogen groups, e.g. hydroxyl, amine, and carboxyl, may be used to react with the isocyanate to produce polymers. Polyurethane foams are cellular materials prepared by the reaction of a polyisocyanate with a polyester polyol or a polyether polyol to form a polymer while simultaneously releasing or generating a gaseous blowing agent internally in the fluid mixture. The gaseous blowing agent forms the cells and the polymer forms the cell walls. Other additives may be used in order to change or enhance some of the properties desired in the final product.

A significant feature of this type of reaction is the reaction of the polyisocyanate and water to liberate carbon dioxide which occurs simultaneously with polymerization and cross linking reactions of the other components to entrap the liberated carbon dioxide. Alternately or additionally, blowing agents may be added to one or more of the components to decrease the cost or to improve the insulating effectiveness of the resultant product. Most of the volatile blowing agents used are handled below their boiling points. Thus, the heat generated by the exothermic reaction volatilizes the blowing agent to form the cells in the resulting polymer. In some instances, the blowing agents are added to one of the chemical components or the chemical mixture under pressure. This technique is referred to as "frothing" in the art. It should be understood that the gaseous blowing agent might result from the reaction of stoichiometric amounts of water and polyisocyanate or from the volatilization of a low temperature boiling solvent dissolved in one or more of the components. The merits of the polyurethane foams are numerous in that they can be foamed in place and are essentially self-curing due to the exothermic heat of reaction liberated during the chemical reaction. They can be formulated to have a wide range of physical properties and densities ranging from 0.5 to 70.00 pounds per cubic foot and can be made fire resistant enough so that they will not sustain combustion in the absence of a flame. The three general foam classifications are flexible, semi-rigid, and rigid, each of which is produced by the particular formulation of components. Some of these materials are widely used as insulation having a K factor (measure of thermal-conductivity) as low as .10 at 70° F., as compared to the K factor of glass fiber insulation at .26. The flexible foams generally have a higher K factor than the rigid foams. Unprotected rigid urethane foam is generally assigned an "aged" value of .15. Under the same conditions, unprotected fiber glass may achieve a value of .5 or higher due to the unimpeded penetration of highly conductive atmospheric moisture.

Heretofore, such products have been produced in the industry by forming blankets of foam by such techniques as spraying, dipping, roller coating, doctor blading, or sandwich calendering of the foam onto a substrate. All of these techniques present problems such as an excess of plastic, so as to produce irregular surfaces, high material losses, or an excessively short handling pot life of the coating material as it would be used. Other difficulties encountered are those of irregular coating thickness and excessively precise machinery tolerances.

With these techniques, a blanket or precast, molded section of material is formed which, if it is to be used for insulation, must be placed onto the pipe or duct work manually and then adhesively sealed in place. The spray technique permits in place application but tends to produce irregular surfaces and high losses. This is particularly true with low diameter tubes or pipes. In one technique developed in Norway, which is described in the March 1962 issue of Modern Plastics, pp. 106 et. seq., a technique is described which comprises applying a foamable polyurethane mixture onto a series of mandrels on a mandrel wheel in which each mandrel contains a paper or similar substrate. This technique involves moving the mixing head the length of the mandrel and the subsequent slitting of the plastic and substrate to remove same from each mandrel of the mandrel wheel after the polyurethane foam is cured.

It is an object of this invention to provide a method and means for coating the internal surface of tubular members evenly with a liquid mixture of reactive polyurethane forming chemicals so as to produce an even uniform coating of polyurethane foam thereon.

Another object of this invention is to provide a continuous method whereby a flexible sheet of material may be coated in the tubular form with a liquid mixture of polyurethane forming chemicals which, in reacting to form polyurethane foam, seals the flexible sheet material in tubular form and forms a coating of uniform thickness on the internal surface thereof.

Still another object of this invention is a continuous method whereby a flexible sheet of material may be formed into a tube, coated with a mixture of liquid reactive polyurethane foam forming chemicals and thereafter returned to a flat planar position so that the resulting polyurethane foam is adhesively secured thereto as a blanket of uniform thickness.

Still another object of this invention is a method and means whereby a liquid mixture of polyurethane foam forming chemicals is dispensed radially by centrifugal force to form an even uniform coating on the internal surface of a tubular member, which member may then be further treated to produce desired products.

Still another object of this invention is a spinning dispensing mixing member for mixing multi-component liquid polyurethane foam forming chemicals and dispensing the mixture radially by centrifugal force.

Other objects will become apparent to those skilled in the art from the detailed description which follows.

The present invention relates to a method and means of dispensing a foamable polyurethane mixture onto the interior surface of a tubular member by centrifugal force. According to this invention, a tubular member which may be pre-formed or which may be formed prior to the coating stage is moved past a dispensing head which contains a spinning member whereby a mixture of reactive polyurethane forming chemicals is thrown radially by centrifugal force onto the interior surface of said tubular member. By controlling the rate of flow of the mixture of liquid chemicals to the mixing head and the lineal movement of the tubular member past said mixing head as well as the chemical formulation of the chemicals, the temperature of the chemicals and of the tubular member, I have found that I may obtain an even distribution of liquid chemicals on the interior surface of the tubular member. In this manner, it is possible to coat the tubular member evenly and continuously without the use of calendering and doctor blading techniques and without moving the mixing head through a pre-determined path by use of a rack according to prior practice. The mixing head is inserted at the midpoint of the diameter of the tube and a spinning motion is imparted to the chemicals so as to mix the chemicals and throw same radially by centrifugal force onto the interior wall of the tube as it moves past the dispensing head. In one embodiment, the tube is formed by engaging a flexible sheet with the arcuate surface of a die and the formed tube is coated so that the reaction of the chemicals to form polyurethane effectively seals the tube and gives it sufficient body to be further manipulated. In another embodiment, the flexible sheet is formed in a tubular shape and is not sealed but is separated along the juncture formed by the two sides of the sheet after being coated but before the mixture has begun to foam. The coated sheet is returned to a flat planar position and the mixture is foamed to produce a blanket of polyurethane foam on the said flexible sheet of material.

In still another embodiment, the coated tubular member is separated and reformed over a cylindrical mandrel so that the reacting polyurethane foam is on the outside and may be thereafter wrapped with a web of suitable material which, depending on the time of application, may be adhesively secured to said tube by the urethane polymer.

Other embodiments will be apparent to those skilled in the art from the attached drawings and the review of the detailed description which follows.

Referring now to the drawings:

FIG. 1 is a perspective view of one embodiment of my invention which is capable of carrying out the process of my invention.

FIG. 2 is an enlarged longitudinal sectional view taken along lines 2—2 of FIG. 1 illustrating the relation of the mixing head to the tube and illustrating the foam rising in the tube. The amount of rise and the distance in which the rise takes place, i.e. the rise time, have been exaggerated for purposes of illustration.

FIG. 3a is a view in perspective of a tube forming die.

FIG. 3 is a sectional view taken along lines 3—3 of FIG. 1 illustrating the relation of the tube forming die to the tube formed from the flexible sheet material.

FIG. 4 is a longitudinal sectional view (which has been contracted for purposes of illustration), illustrating a method of feeding a flexible tubular member into the formed tube so as to form an inner layer adhesively secured to the foam.

FIG. 5 is a perspective view illustrating one method of stripping the formed tube from a mandrel through which said flexible tubular member is fed.

FIG. 6 is an enlarged diagrammatic view illustrating the movement of the flexible tubular member back over the exterior surface of the mandrel and into engagement with the foam.

FIG. 7 is a top plan view which illustrates one method of bringing the foam coated tube back to a flat planar position and into a curing zone.

FIG. 7a is an enlarged section taken along lines 7a—7a of FIG. 7 which illustrates the blanket of foam on the sheet of flexible substrate.

FIG. 8 is a side elevational view illustrating a method of separating the formed tube and bringing it back to a flat planar position and thereafter applying a second flexible sheet of material to the surface of the foam to adhesively secure it thereto by contact with the uncured urethane polymer to form a laminated member.

FIG. 8a is a sectional view taken along lines 8a—8a of FIG. 8 illustrating the sandwich construction of the foam between two layers of flexible sheet material.

FIG. 9 is a side elevation illustrating a method of separating the sides of the formed tube bringing it back to a sheet in a flat planar position, stripping the sheet of flexible material from the foam blanket, and thereafter curing the foam.

FIG. 9a is a section taken along lines 9a—9a of FIG. 9 which illustrates the formed blanket of polyurethane foam.

FIG. 10 is a side elevation illustrating still another modification of my invention wherein the coated tube substrate is separated and is then inverted over a mandrel while the reactive chemicals are still in a liquid or semi-liquid state and the rising foam is thereafter wrapped with webs of flexible material such as paper, tape or aluminum foil which are adhesively secured thereto by contact with the uncured urethane polymer.

FIG. 11 is a side elevation illustrating a method of coating a pre-formed tubular member, such as a pipe, in a piece by piece rather than a continuous method.

FIG. 12 is a perspective view of the mixing dispenser of my invention with special emphasis on the spinning dispenser and mixing member.

FIG. 13 is a perspective view illustrating the spinning dispenser and mixing member in greater detail.

FIG. 14 is a sectional view of the mixing dispensing head illustrating the distribution passages and their relation to the spinning mixing dispensing member.

Referring now in deail to the drawings and specifically to FIG. 1, there is shown a complete illustration of one method of my invention. In this drawing, a sheet 1 of flexible material such as paper is fed from a roll 2 supported on shaft 3 into a tube forming die 4. It will be noted that the tube forming die 4 is bent over on its interior surface at 4a and 4b so as to engage the sides 1a and 1b of the sheet of paper, respectively. This forms an overlap or seam at 1c. The tubular member thus formed is fed through a collar member 5 containing a temperature controlling element and from there into a second collar member 6 which is also temperature controlled. For convenience, the formed tube is denoted by numeral 29 whether it consists of paper or other substrate coated with foam or if it is a foam tube after the paper has been stripped off. As is illustrated in FIG. 1, the paper substrate 1 of tube 29 is separated at seam 1c and fed through stripping rollers 8 and 9. Thereafter, the foam tube 29 is fed onto conveyor as represented by rollers 10 and 11 driven by shafts 12 and 13. At the end of the conveyor, the foam tubular member 29 is cut off by revolving knife 14 supported by shaft 15 driven by motor 16, which is synchronized with tube movement to give straight cut.

As is best shown in FIG. 2, the mixing head 18 is held in position at the mid-point of the diameter of the tube by shaft 17. The mixing head consists of a motor 19, a distribution section 20, and the mixing section 23. Shaft 25 connected to motor 19 is secured to the spinning mixing and dispensing member 24 so that reactive polyurethane foam forming chemicals fed through lines 22 into the distribution section of the mixing head via coupling 21 are mixed and thrown radially through radially extending grooves 26 by centrifugal force to evenly coat the interior surface of the tube. This liquid coating 27, as the reaction proceeds, begins to rise in heated collar member 5 to form foam 28 which thereafter is subjected to heat in heated collar member 6 to partially cure it. Thereafter, as previously indicated, the flexible paper substrate 1 may be stripped from the tubular member and the foam tube cut into suitable lengths to go to the final curing oven. It will be noted that it is important to maintain the tubular substrate at a predetermined temperature. In the embodiment shown in FIG. 1, the sheet material 1 entering the tube forming die is preheated by means of radiant lamps 40 and thereafter the proper temperautre is maintained by means of temperature controlled collars 5 and 6.

Depending on the desired product, the rise or induction time of the mixed polyurethane forming chemicals may be varied to be fast or slow by variation of the chemical formulation, the temperature of the chemicals, or of the substrate or a combination of the three. Thus, for example, in the embodiment shown in FIG. 1 a fast rise time in the order of from 5 to 10 seconds may be employed to increase the throughput of the molded tubing, however, where the coated tubular member is to be manipulated so as to be brought back to a flat planar position as illustrated in FIGS. 7, 8 and 9 or reformed over a mandrel as illustrated in FIG. 10, a slow rise time is preferred. In these embodiments, the manipulation of the coated sheet material must occur while the chemicals are in a liquid state, i.e., before the material begins to foam. Formulations and conditions affecting the rise time of the foam forming mixture are well known in the art and are mentioned here to clarify the disclosure as to process steps hereinafter to be described. Generally, if the foam is to be cured in situ on the tubular substrate, two heated collars 5 and 6 are utilized. Collar 5 is temperature controlled to maintain control over the foaming reaction to insure uniformly of the process and the product. Collar 6 is temperature controlled to pre-cure or cure the resulting foam.

In some instances, it is desirable to form a tube having an internal and external covering. A method of achieving this result is illustrated in FIGS. 4, 5, and 6. In this embodiment, a flexible tubular member 51, such as polyethylene, is fed into a hollow mandrel 50 which is inserted into the tubular member 29 so as to project just upstream to the point at which the foam has completely risen. Thereafter, the tubular member 51 is drawn over the rounded ends 52 of the mandrel at point 53 so that the tubular material engages with the foam and becomes adhesively secured thereto. The formed tube after partial curing in collar 6 is thereafter slit by means of knife 7 and peeled away from the mandrel (see FIG. 5). The split tube thus formed has an internal smooth surface of polyethylene or other material which is pliable and stretchable over the mandrel, an intermediate layer of foam and an external paper or metallic foil surface and is admirably suited to be snapped over existing pipe work for purposes of insulation.

As previously indicated, one object of this invention is a method whereby particular substrates may be evenly coated with reactive polyurethane forming chemicals so as to produce a blanket of foam of even thickness and consistency. A method of achieving this end is illustrated in FIG. 7 whereby the formed tube 29, after having been coated with the reactive polyurethane forming chemicals, is separated while the chemicals are still in the liquid state and brought back to a flat planar position and into a foam initiating and curing zone consisting of radiant lamps 40. Thereafter, blankets of predetermined size may be cut off by means of knife 14.

In still another embodiment as shown in FIG. 8, it is possible to separate the sides of the coated and formed tube 29 while the coating is in liquid state so as to bring the material back to a flat planar position and while the foam is rising or is in a tacky state, a second sheet of flexible material 32 is added from roll 30. Roll 30 is supported by shaft 31. In this instance, the material is run through heated platens 36 and 37 to cure same between the two layers of substrate. In this method, a laminated member is produced consisting of a top and bottom layer of substrate and an intermediate layer of foam.

In still another embodiment, as illustrated in FIG. 9, it is possible to separate the tubular member 29 and after the foam has become substantially non-tacky, strip the paper substrate 1 therefrom by running same through rollers 8 and 9 after subjecting the blanket of foam to a curing treatment by running same over heated platen 37 and under radiant lamps 40.

In still another embodiment, as illustrated in FIG. 10, the tubular member 29 is separated and is thereafter inverted and formed around mandrel 60 so that the coating begins to foam after the sheet is formed around mandrel 60. Thereafter, the foam in tacky condition is wrapped with webs 66 of aluminum foil or paper by use of a web wrapping mechanism. The wrapped tube is thereafter run through a temperature controlled collar 6 to cure the foam and adhesively secure it to the external wrapping. The web wrapping mechanism 61 is similar in operation to that described by E. C. Hughes in U.S. 2,126,556 and consists of wrapping material suspended on shafts 63. Said shafts are secured to circular housing 64 which, in turn, is driven by belt 65 trained over pulley 68 which is driven by means of shaft 69 connected to motor 67.

The mixing head utilized in my invention consists of distribution block 20 into which chemical components are fed through lines 22 via coupling 21. Coupling 21 communicates with liquid passages 72 which terminate into ports 71 located on the face 74 of the distribution section 23. Shaft 25 connected to motor 19 extends through the distribution block 20 and is threaded at 75 to be threadably secured with the threaded boss 76 of spinning member 24. Spinning member 24 contains on its interior surface an annular recess or well 73 which is held in spaced relation with the face 74 of distribution section 23 by means of shaft 25. Communicating with recess or mixing well 73 are a series of radially disposed grooves 26 in spinning member 24. Complementary lateral grooves 26a are cut in face 74 of the distribution block 20. Liquid components emerging from ports 71 are mixed in the mixing well 73 and by reason of the spinning member 24 are mixed and dispensed radially through mixing and dispensing grooves 26 and 26a. Thus, as motor 19 supported on supporting shaft 17 turns, shaft 25 turns the spinning mixing and dispensing member 24 rapidly to mix the chemicals and throw the mixture through the radially disposed grooves 26 and 26a by centrifugal force to evenly coat the surface of the tubular members.

As previously mentioned, it is possible to operate the process of my invention in a continuous or intermittent method. In FIG. 11 there is illustrated a method whereby a tubular member such as a pipe 41 may be coated in a non-continuous manner. In this embodiment, the pipe 41 is placed onto the endless belt 44 driven by rollers 43 supported on shafts 42 and the belt is driven backward until pipe 41 comes in contact with limit switch 45. Thereafter, through control means not shown the conveyor belt 44 is driven forward and the mixing head 18 is turned on so as to coat the interior surface of said pipe. Thereafter, another pipe 41 is placed on the belt for coating in a similar manner.

As previously indicated, most rigid or flexible foam formulations may be utilized in the process of my invention. Typical expansion or rise times for various foam formulations have been reported by R. E. Knox in a Foam Bulletin published by the Du Pont Company. These are as follows:

|  | Foam Formulation | | |
| --- | --- | --- | --- |
|  | Polyether Type Rigid Foam | Polyester Type Rigid Foam | Polyether Type Resilient Foam |
| Phase I—Expansion: | | | |
| (a) Induction (time from pour to start of foaming) (minutes) | 0.5 | 0.25 | 0.5 |
| (b) Foam expansion (including time to tack-free state)(minutes) | 7.0 | 2.0 | 6.0 |

However, in some embodiments of my invention, I prefer to utilize faster foam formulations having a rise or induction time in the range of from 5 to 10 seconds. Typical foam formulations having an induction time of this order are well known in the art and have been disclosed in the co-pending application of Sherman A. Stewart, Ser. No. 355,293, which is owned by the assignee of this application. In other embodiments of my invention where it is desired to coat a tubular sheet and thereafter bring it to a flat planar position and subject same to further manipulation before the induction time commences, it is desirable to use slower formulations such as those referred to by R. E. Knox and which are well known in the art.

The forms of the invention as herein disclosed are considered to be exemplary in nature. It will be apparent to those skilled in the art that numerous modifications may be made therein without departure from the spirit of the invention or the scope of the appended claims.

I claim:
1. A method of coating a sheet of flexible material with liquid polyurethane foam forming chemicals, which comprises:
   (1) continuously bending a sheet of flexible material to form a tube;
   (2) moving the tube at a uniform speed along its longitudinal axis;
   (3) introducing liquid polyurethane foam forming chemicals at the center point of the interior diameter of said tube, equidistant from the walls of said tube;
   (4) throwing said chemicals radially and outwardly by centrifugal force to uniformly and evenly coat the interior surface of the moving tube with said liquid polyurethane foam forming chemicals.

2. A method of coating a sheet of flexible material, as defined in claim 1, the further improvement which comprises the steps of:
   (1) foaming and curing the liquid polyurethane foam forming chemicals on the interior surface of said tube.

3. A method of coating a sheet of flexible material, as defined in claim 1, the further improvement which comprises the steps of:
   (1) foaming the liquid polyurethane foam forming chemicals on the interior surface of said tube;
   (2) thereafter slitting the flexible material and stripping same from said polyurethane foam; and
   (3) curing the resulting tubular polyurethane foam member.

4. A method of coating a sheet of flexible material, as defined in claim 1, the improvement in forming the tube which comprises:
   (1) subjecting said sheet of flexible material to a zone of constant temperature while said sheet is being bent to form a tube.

5. A method of coating a sheet of flexible material, as defined in claim 1, the improvement in continuously forming the tube which comprises the steps of:
   (1) feeding said sheet of flexible material from a roll in a direction perpendicular to the axis of said roll and thereafter continuously bending said sheet across its minor axis so that the sides of said sheet overlap to produce an unsealed shaped tube.

6. A method of coating a sheet of flexible material, as defined in claim 5, the further improvement which comprises the steps of:
   (1) supporting the shaped tube in tubular form sufficiently long for the reactive polyurethane foam forming chemicals to react to form a polyurethane foam and seal the tube at the overlap formed by the two sides of said sheet; and
   (2) thereafter curing said foam on the interior surface of the sealed tube.

7. A method of coating a sheet of flexible material, as defined in claim 5, the improvement which comprises the further steps of:
   (1) separating the two sides of the sheet before the chemicals react to form a polyurethane foam and returning the sheet to a flat planar position;
   (2) continuously bending said sheet across its minor axis to form a tube so that the two sides meet at a juncture with the chemicals on the outside of said tube;
   (3) initiating a chemical reaction to produce a polyurethane foam;
   (4) thereafter wrapping the foam with an outer covering while said foam is tacky to adhesively secure said outer covering thereto;
   (5) thereafter curing the polyurethane foam.

8. A method of coating a sheet of flexible material, as defined in claim 5, the further improvement which comprises the steps of:
   (1) separating the unsealed sides of said sheet and returning the sheet to a flat planar position before the polyurethane foam forming chemicals react to form a foam;
   (2) initiating a chemical reaction to produce a polyurethane foam;
   (3) moving the flat sheet through a zone of elevated temperature to cure the foam in situ on the sheet of flexible material.

9. A method of coating a sheet of flexible material as defined in claim 5, the further improvement which comprises the steps of:
   (1) separating the unsealed sides of said sheet forming the tube and returning the sheet to a flat planar position before the polyurethane foam forming chemicals react to form a polyurethane foam;
   (2) initiating a chemical reaction to form a polyurethane foam;
   (3) feeding a second sheet of material in the same direction and in a plane parallel to the plane of the coated sheet as the foam rises and is in tacky condition so that the second sheet becomes adhesively engaged with the polyurethane foam to form a laminated member; and (4) moving the laminated member to a zone of controlled temperature and curing same.

10. A method of coating a sheet of flexible material as defined in claim 1, the further improvement which comprises the steps of:

(1) initiating a chemical reaction of the polyurethane foam forming chemicals on the interior surface of said tube to form a foam of polyurethane;

(2) inserting at the other end of said tubular member a hollow mandrel which extends into said tubular member to a point upstream of the point at which the foam has completely risen;

(3) feeding into the interior of said mandrel a second flexible tubbular member and pulling said flexible tubular member back over the end of said mandrel and along the exterior surface of said mandrel in the same direction as the first tubular member is moving;

(4) adhesively securing said second flexible member to the rising foam while it is in tacky condition;

(5) slitting the formed tube at a point in front of the point of insertion of said mandrel in said first tubular member;

(6) pulling the slit tube around and away from the rear portion of said mandrel;

(7) thereafter curing the slit tubular member.

11. A method of coating a flexible material as defined in claim 1, the improvement in coating said moving tube which comprises:

(1) simultaneously mixing and radially throwing said liquid polyurethane foam forming chemicals outwardly by centrifugal force to uniformly and evenly coat said tube.

References Cited

UNITED STATES PATENTS

| | | | |
|---|---|---|---|
| 3,297,802 | 1/1967 | Powers | 264—54 XR |
| 3,118,800 | 1/1964 | Snelling | 156—201 XR |
| 3,123,508 | 3/1964 | Waugh | 156—78 |
| 3,061,475 | 10/1962 | Wallace | 156—79 XR |

EARL M. BERGERT, *Primary Examiner.*

PHILIP DIER, *Examiner.*